United States Patent
Sweetman et al.

(10) Patent No.: US 10,265,813 B2
(45) Date of Patent: *Apr. 23, 2019

(54) METHOD OF JOINING SINTERED PARTS OF DIFFERENT SIZES AND SHAPES

(71) Applicant: SANDVIK INTELLECTUAL PROPERTY AB, Sandviken (SE)

(72) Inventors: Gary William Sweetman, Coventry (GB); Ihsan Al-Dawery, Coventry (GB); Jonathan Fair, Solihull (GB)

(73) Assignee: SANDVIK INTELLECTUAL PROPERTY, Sandviken (SE)

(*) Notice: Subject to any disclaimer, the term of this patent is extended or adjusted under 35 U.S.C. 154(b) by 460 days.

This patent is subject to a terminal disclaimer.

(21) Appl. No.: 14/211,105

(22) Filed: Mar. 14, 2014

(65) Prior Publication Data

US 2014/0271003 A1    Sep. 18, 2014

Related U.S. Application Data

(60) Provisional application No. 61/800,836, filed on Mar. 15, 2013.

(51) Int. Cl.
*B23P 15/32* (2006.01)
*B22F 7/06* (2006.01)
(Continued)

(52) U.S. Cl.
CPC ............ *B23P 15/32* (2013.01); *B22F 7/062* (2013.01); *B23B 51/00* (2013.01); *B23B 51/02* (2013.01);
(Continued)

(58) Field of Classification Search
CPC ......... B23B 51/02; B23B 51/06; B22F 7/062; B22F 2005/001; C22C 29/02; B23P 15/28;
(Continued)

(56) References Cited

U.S. PATENT DOCUMENTS 4,350,582 A    9/1982    Engle
4,386,959 A    6/1983    Frehn
(Continued)

FOREIGN PATENT DOCUMENTS

CN    1116143 A    2/1996
CN    1269273 A    10/2000
(Continued)

OTHER PUBLICATIONS

PCT/IB/2014/059798 International Search Report and Written Opinion.

*Primary Examiner* — Daniel Howell
*Assistant Examiner* — Paul M Janeski
(74) *Attorney, Agent, or Firm* — Corrine R. Gorski

(57) ABSTRACT

A method of joining a plurality of parts to form a unitary body. At least two sintered parts are provided. At least one of the sintered parts has at least one internal channel. Each of the parts is formed of a hard metal composition of material. The at least two sintered parts are assembled into the shape of a unitary body. Each of the at least two sintered parts has a joining surface and when each joining surface is brought into contact the surfaces form a bonding interface therebetween. The assembled parts are subjected to a vacuum or gas atmosphere, without the application of external pressure, and to a temperature sufficient to fuse the at least two sintered parts together at the bonding interface to form the unitary body.

37 Claims, 3 Drawing Sheets

(51) Int. Cl.
*B23B 51/00* (2006.01)
*B23B 51/06* (2006.01)
*B23B 51/02* (2006.01)
*C22C 29/02* (2006.01)
*B23P 15/28* (2006.01)
*B22F 5/00* (2006.01)

(52) U.S. Cl.
CPC .............. *B23B 51/06* (2013.01); *C22C 29/02* (2013.01); *B22F 2005/001* (2013.01); *B23B 2222/16* (2013.01); *B23B 2222/28* (2013.01); *B23B 2250/12* (2013.01); *B23B 2250/16* (2013.01); *B23P 15/28* (2013.01); *Y10T 408/458* (2015.01); *Y10T 408/89* (2015.01); *Y10T 408/9095* (2015.01); *Y10T 408/9097* (2015.01)

(58) Field of Classification Search
CPC .... B23P 15/32; Y10T 408/458; Y10T 408/89; Y10T 408/9095; Y10T 408/9097
See application file for complete search history.

(56) References Cited

U.S. PATENT DOCUMENTS

| | | | | |
|---|---|---|---|---|
| 4,880,707 A | * | 11/1989 | Kohno | B22F 7/06 408/144 |
| 5,186,739 A | * | 2/1993 | Isobe | B23B 51/00 407/119 |
| 5,186,892 A | | 2/1993 | Pope | |
| 5,273,379 A | * | 12/1993 | Nishimura | B23B 51/02 408/144 |
| 5,333,520 A | | 8/1994 | Fischer et al. | |
| 6,315,945 B1 | | 11/2001 | Macki et al. | |
| 6,908,688 B1 | | 6/2005 | Majagi et al. | |
| 7,469,972 B2 | | 12/2008 | Hall et al. | |
| 9,498,824 B2 | * | 11/2016 | Sweetman | B22F 7/062 |
| 2002/0005085 A1 | | 1/2002 | Macki et al. | |
| 2006/0288820 A1 | * | 12/2006 | Mirchandani | B21C 23/22 76/108.1 |
| 2010/0290849 A1 | * | 11/2010 | Mirchandani | B22F 7/062 408/144 |
| 2011/0020085 A1 | | 1/2011 | Glaser et al. | |
| 2011/0182684 A1 | * | 7/2011 | Yoon | B22F 7/062 408/226 |
| 2012/0087746 A1 | | 4/2012 | Fang | |

FOREIGN PATENT DOCUMENTS

| | | | | |
|---|---|---|---|---|
| CN | 1692998 A | | 11/2005 | |
| CN | 101166597 A | | 4/2008 | |
| CN | 100553860 C | | 10/2009 | |
| EP | 0380096 A1 | | 8/1990 | |
| EP | 1502721 A2 | | 2/2005 | |
| EP | 1593442 A1 | | 11/2005 | |
| JP | 59-136404 A | | 1/1983 | |
| JP | S61117003 A | | 6/1986 | |
| JP | 61152308 A | * | 7/1986 | ............. B23B 51/00 |
| JP | H02-269515 A | | 11/1990 | |
| JP | H06240308 A | | 8/1994 | |
| JP | H10130942 A | | 5/1998 | |
| JP | 2008132539 A | | 6/2008 | |
| WO | 200211931 | | 2/2002 | |
| WO | 2008051588 A2 | | 5/2008 | |

\* cited by examiner

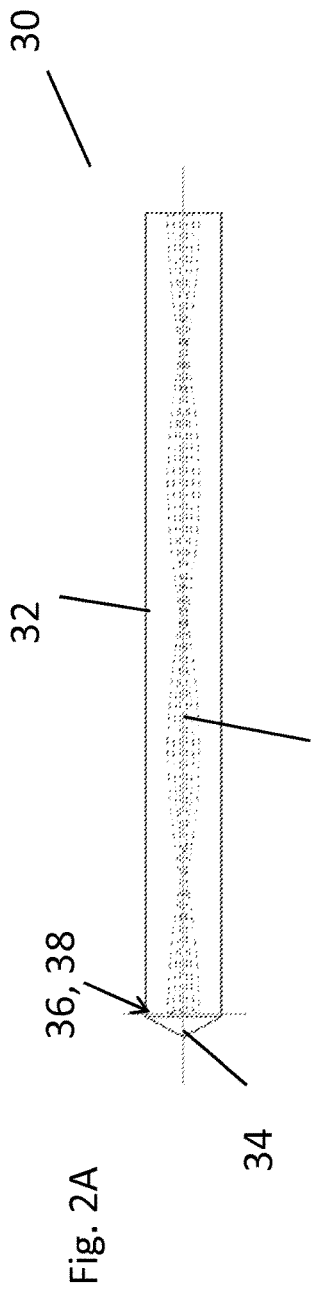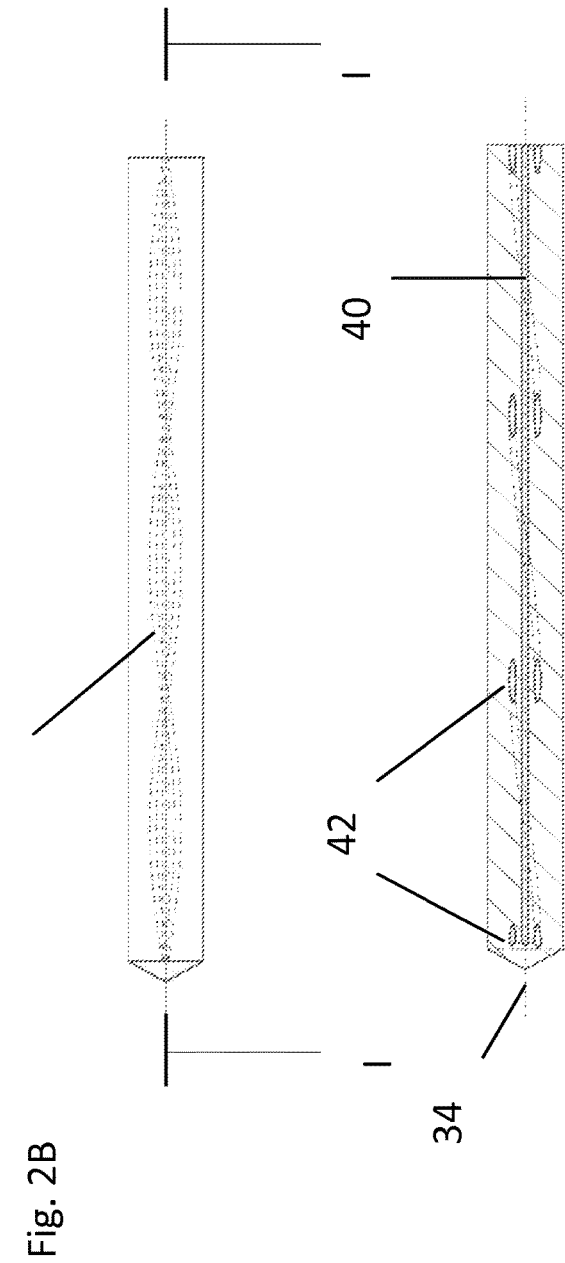

METHOD OF JOINING SINTERED PARTS OF DIFFERENT SIZES AND SHAPES

RELATED APPLICATION DATA

This application is related to U.S. patent application Ser. Nos. 14/211,054 and 14/211,020, both filed on Mar. 14, 2014 and assigned to the same assignee of the present application.

TECHNICAL FIELD AND INDUSTRIAL APPLICABILITY

The present disclosure relates to a method of joining different sized and/or shaped parts or members to form a unitary body, and more particularly, to a method for joining sintered parts of different sizes and/or shapes to form a unitary tool or wear part.

SUMMARY

In one aspect there is provided a method of joining a plurality of parts to form a unitary body. At least two sintered parts are provided. Each of the parts is formed of a hard metal composition of material. At least one of the sintered parts having at least one internal channel. The at least two sintered parts are assembled into the shape of a unitary body. Each of the at least two parts has a joining surface and when each joining surface is brought into contact the surfaces form a bonding interface therebetween. The assembled parts are subjected to a vacuum or gas atmosphere, without the application of external pressure, and to a temperature sufficient to fuse the at least two sintered parts together at the bonding interface to form the unitary body.

In another aspect a wear resistant tool includes a plurality of sintered parts. At least one of the sintered parts having at least one internal channel. Each of the parts is formed of a hard metal composition of material, wherein the plurality of sintered parts can be assembled into a shape of a unitary body. A joining surface is disposed on each of the plurality of sintered parts, wherein when the parts are assembled each joining surface is brought into contact to form a bonding interface therebetween, such that when the assembled parts are subject to a vacuum or gas atmosphere, without the application of external pressure, and to a temperature sufficient to fuse the plurality of parts, the plurality of parts are joined together at a respective bonding interface to form the unitary body.

These and other objects, features, aspects, and advantages of the present disclosure will become more apparent from the following detailed description of the preferred embodiment relative to the accompanied drawings, in which:

BRIEF DESCRIPTION OF THE DRAWINGS

FIG. 2A is a perspective view of still another body made according to the present method.

FIG. 2B is an end view of the body of FIG. 2A.

FIG. 2C is a cross-sectional view of the body taken along line I-I of FIG. 2A.

DETAILED DESCRIPTION

Figure 1:
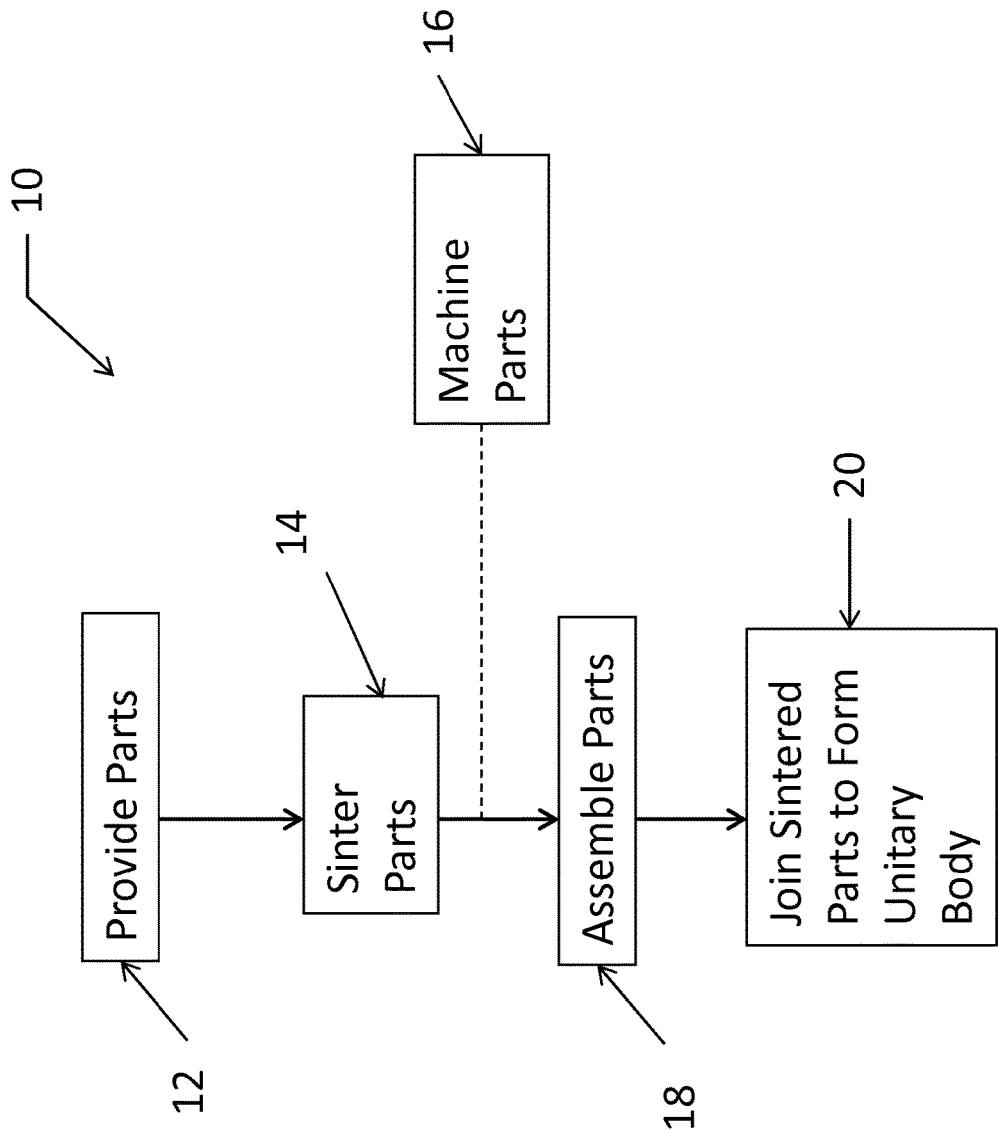
FIG. 1 is a flow diagram illustrating the steps of the present method.

High wear resistant materials, such as cemented carbide, are popular for rock and metal drilling tools and for wear parts. Bodies of these materials are usually made by powder metallurgical methods, namely, pressing and sintering.

There are numerous methods for joining multi-member cemented carbide bodies. A multi-member cemented carbide body can be independently formed of distinct green bodies. Sometimes, the independently formed green bodies are also independently sintered and, sometimes after grinding, assembled, for example, by soldering, brazing, direct pressing or shrink fitting to form a multiple-region cemented carbide body. Hence, the desired form of the sintered body is usually obtained before sintering after which the partial bodies are sintered together to form a body with a desired, often complex geometry, because machining of the sintered body is expensive.

For example, standard methods of producing multi-sized tools involve producing parts having the maximum size and then removing material before sintering, after sintering or both. This results in a significant amount of the cemented carbide being lost.

Alternatively, independently formed bodies are assembled and then sintered. However, the different combinations of the same ingredients that comprise the independently formed bodies respond to sintering differently. Each combination of ingredients responds uniquely to a sintering temperature, time, atmosphere or any combination of the proceeding and thus shrinks uniquely.

Moreover, there is the disadvantage due to the large amounts of liquid phase migrating significant distances into each of the bodies. This sometimes results in severe compositional changes.

It is known to form complex shaped articles comprised of dissimilar materials, wherein the interface between the materials may be very narrow. See U.S. Pat. No. 6,315,945 wherein pluralities of separate bodies are arranged such that each separate body is in contact with at least one other separate body to form an aggregate body. The aggregate body is then consolidated at a temperature, superatmospheric pressure, time at temperature and time at the superatmospheric pressure sufficient to form a consolidated shaped article. The consolidated shaped article has a shape defined by each of the separate bodies used to make the article. However, the use of superatmospheric pressure is time consuming and expensive.

U.S. Pat. No. 6,908,688 also discloses the use of superatmospheric to form a hard metal tool having different joined bodies. In this and in the other known methods significant migration of the constituents across the boundary of the parts occurs. This can lead to precipitation of embrittling phases and long gradient zones of intermediate properties, causing, in severe cases, large scale density changes and consequent distortion of the parts.

Thus, there is a need for a method of joining or fusing, pre-sintered members to form a tool of complex geometry without the need for pressure, grain growth at the boundaries or wasting of expensive material.

Referring to FIGS. 1 and 2A-2C, a method of bonding or joining at least a pair of parts or materials is described. In a first step 12, a plurality of parts, 32 and 34 are provided. The parts can be of the same size or shape or different sizes or shapes. It should also be appreciated that numerous parts can be joined according to the present disclosure, which should not be limited to a particular number of parts used to form a unitary body 30. A unitary body is defined as a singular body of connected parts. For example, body 30 can be a wear resistant tool such as a step drill having different diameter parts.

Parts 32 and 34 can be made from hard metal compositions of compacts of liquid phase sintered materials, which include low melting phase components and high melting phase components. A hard metal composition is a composite material having a hard phase composed of tungsten one or more carbides, nitrides or carbonitrides of tungsten, titanium, chromium, vanadium, tantalum, niobium bonded by a metallic phase binder typically cobalt, nickel, iron or combinations thereof in varying proportions, such as a cemented carbide or cermet. A cemented carbide has a hard phase composed of tungsten carbide and of one or more carbides, nitrides or carbonitrides of titanium, chromium, vanadium, tantalum, niobium bonded by a metallic phase binder typically cobalt, nickel, iron or combinations thereof in varying proportions. A cermet has a hard phase composed of one or more carbides, nitrides or carbonitrides of titanium, chromium, vanadium, tantalum, niobium bonded by a metallic phase typically cobalt, nickel, iron or combinations thereof in varying proportions.

Cemented carbides and cermet exist in different grades. Grade refers herein to a cemented carbide or cermet in one of several proportions and with a certain grain size. A high quality grade is a material with a quantifiably greater performance and reliability in a given application.

For example, the parts can be cemented carbide of the same composition, or two or more different compositions and being different with respect to grade and/or grain size that are fused together, as will be described further herein.

Each part has been sintered for obtaining substantially the full density and hardness thereof. See step 14. Each part has a joining surface 38. In step 16 the parts are ground or machined at the mating/joining surfaces to provide a sufficiently smooth finish between the parts. The parts can also be cleaned, for example, in a hydrogen cleaning process, to provide a clean interface at the joining surfaces. Thereafter, the individual, parts are assembled into the desired tool shape in step 18.

Step 20 involves bringing the parts into contact in an assembled relationship with a first bonding or joining surface 38 between two of the members in mating engagement with a second bonding or joining surface between the other of the parts to each define a bonding or boundary zone 36. Thereafter, the step of heating the parts in the assembled relationship is employed to fuse the parts together.

In step 20, the parts are fused at a temperature low enough so that no grain growth occurs. For example, of about 1340° C. to about 1360° C. for about 10 to about 30 minutes, and more preferable about 1350° C. for about 15 minutes. In other words, the parts are fused at a temperature lower than or intermediate to the melting point of the hard metal composition having the lowest original sintering temperature of the parts. This lower temperature and shorter time enables the fusing to proceed by short range diffusion of the binder metals across the interface and no grain size changes are induced in the microstructures.

This step takes the already dense and hard piece of carbide and puts it back into the sintering furnace. But, instead of getting shrinkage and a more density, as in the first sintering operation, the part remains essentially the same in physical properties. The minimal amount of liquid phase possible occurs, but still bonding is enabled to take place.

Referring again to FIGS. 2A-2C, the present method enables joining of sintered parts having different sizes and shapes to form a unitary tool or wear part. Although tool 30 is described in this example, it should be appreciated that, and as shown in the following examples, a body comprised of different material, sized or shaped members can be made according to the present method. Accordingly, the sizing and/or shaping of the parts are a function of the particular unitary body or tool desired and the particular physical and/or dimensional characteristics are therefor according to satisfactorily meet an intended use.

Different grade materials can be joined to optimize local properties of, for example, the tool or wear part. Thus, for example, wear resistance, toughness, brazability, friction coefficient and/or cubic boron nitride (cBN) content of a material can be chosen depending on the location of the material in the tool or wear parts. Moreover, a cobalt or grain-size mismatch can also be chosen to induce binder metal fusing and consequent density changes. This can induce compressive stresses at the tool or part surfaces to provide a toughening effect. Also, multilayers having large cobalt content or grain size mismatch can be incorporated for crack deflection.

The present methodology allows for pre-shaping of grooves, channels or holes at the interface of the fused parts allowing cooling channels to be constructed. Referring again to FIGS. 2A-2C, the tool or wear part 30 has internal coolant channels for applications where the coolant flows internally within the parts so no coolant contact with the material is desired. This feature allows the work environment to be kept clean and easy to recycle.

As shown, body 32 has a feeder channel 40 that extends down the center of the body. A plurality of helical channels/holes 42 extend along the length of the tool. Coolant flows through feeder channel 40 and out through the helical channels 42. Helical channels 42 are blocked by part or point 34 that is fused to body 32 at boundary zone 38.

Figure 3A:
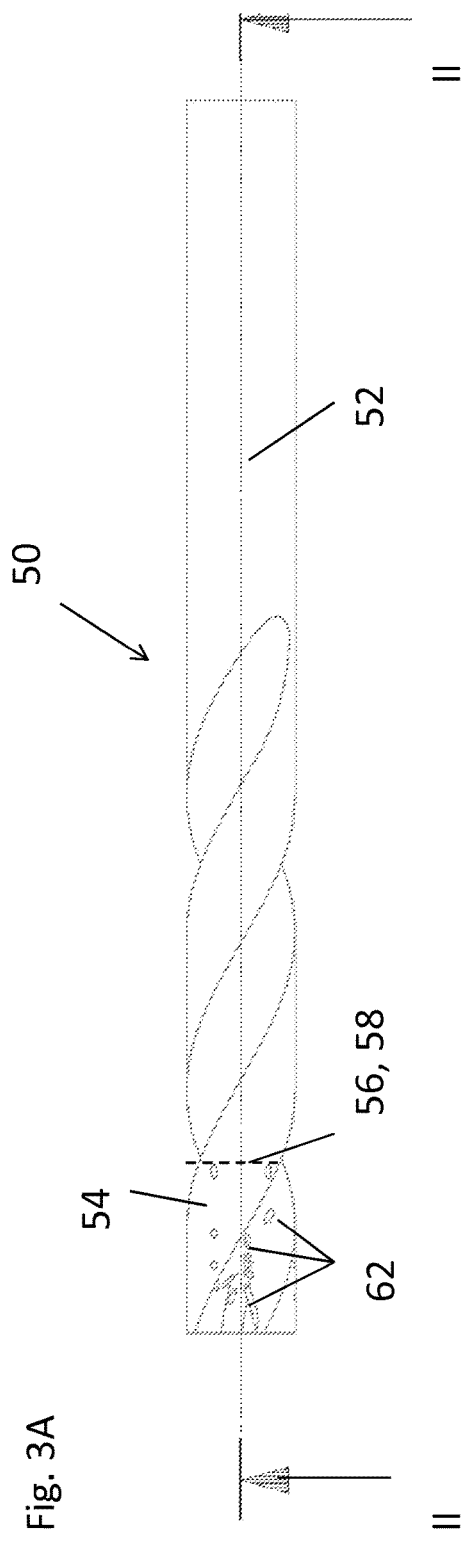
FIG. 3A is a perspective view of still another body made according to the present method.
Figure 3B:
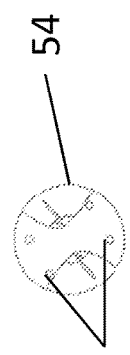
FIG. 3B is an end view of the body of FIG. 3A.
Figure 3C:
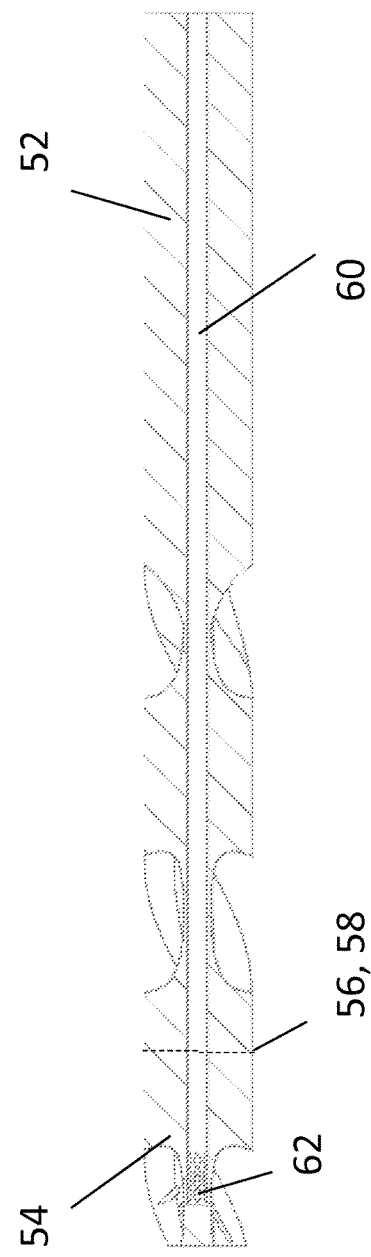
FIG. 3C is a cross-sectional view of the body taken along line II-II of FIG. 3A.

Any number, position, and/or angles of coolant channels/holes can be provided in a tip of the tool or drill without changing the rest of the drill. As shown in FIGS. 3A-3C, a drill 50 has a body or shank 52 and an end part or tip 54 fused at joining surfaces 56 and boundary zone 58 according to the present methodology. Body 52 has an internal coolant channel 60. Tip 54 has a plurality of coolant holes 62, the geometries of which can be machined in the tip prior to fusing. For example, the tip blank can have the coolant holes 62 drilled into the blank while it is in a pre-sintered green state to produces holes at any angle and diameter.

The disclosed method can be used to build complex shapes from a stock of different parts allowing for under cuts, side holes, voids, profile changes etc., but avoiding MAP/PIM or machining.

Most importantly, any of the above features can be combined in a single tool or part. For example, different parts can be carefully selected and joined together to suit particular applications where wear, chemical resistance, etc. is required.

The present methodology offers many advantages, included but not limited to, significant cost savings and environmentally friendly production. Key advantages also include formation of complex shapes not possible by conventional processing or machining. Also material combinations not possible by current methods can be achieved.

Although the present disclosure has been described in relation to particular embodiments thereof, many other variations and modifications and other uses will become apparent to those skilled in the art. It is preferred therefore, that the present disclosure be limited not by the specifics disclosed herein, but only by the appended claims.

What is claimed is:

1. A method of joining a plurality of parts to form a unitary body comprising the steps of:
providing at least two previously sintered parts, each of the parts being formed of a hard metal composition of material, at least one of the previously sintered parts having at least one internal channel;
assembling the at least two previously sintered parts into a shape of a unitary body, wherein each of the at least two parts has a joining surface and when each joining surface is brought into contact the joined surfaces form a bonding interface therebetween; and
subjecting the assembled at least two parts to a vacuum or gas atmosphere, without the application of external pressure, and to a temperature sufficient to fuse the at least two previously sintered parts together at the bonding interface to form the unitary body.

2. The method of claim 1, wherein the hard metal composition of material is cemented carbide.

3. The method of claim 2, wherein the cemented carbide has a hard phase of tungsten carbide and of one or more carbides, nitrides or carbonitrides selected from the group of titanium, chromium, vanadium, tantalum, niobium bonded by a metal phase selected from the group of cobalt, nickel, iron and combinations thereof.

4. The method of claim 2, wherein each of the at least two previously sintered parts is made of the same cemented carbide.

5. The method of claim 2, wherein each of the at least two previously sintered parts is made of a different cemented carbide.

6. The method of claim 1, wherein the hard metal composition of material is a cermet.

7. The method of claim 6, wherein the cermet has a hard phase selected from the group of one or more carbides, nitrides or carbonitrides of titanium, chromium, vanadium, tantalum, niobium bonded by a metallic phase selected from the group of cobalt, nickel, iron and combinations thereof.

8. The method of claim 1, wherein the at least two previously sintered parts each having a sintering temperature, the assembled parts being heated to a temperature lower than a melting point of the previously sintered part having a lowest sintering temperature of the at least two previously sintered parts to fuse the parts at the bonding interface.

9. The method of claim 1, wherein the temperature the assembled parts are heated to of about 1340° C. to about 1360° C.

10. The method of claim 9, wherein the assembled parts are heated for a time period of about 10 to about 30 minutes.

11. The method of claim 9, wherein the assembled parts are heated to a temperature of about 1350° C. for about 15 minutes.

12. The method of claim 1, wherein each of the at least two previously sintered parts has a different shape.

13. The method of claim 1, wherein the unitary body is a wear resistant tool.

14. The method of claim 1, wherein the unitary body is a tool blank.

15. The method of claim 1, wherein the unitary body is a wear part.

16. The method of claim 1, wherein each of the at least two previously sintered parts has a different size.

17. The method of claim 1, wherein the at least two previously sintered parts comprise a plurality of previously sintered parts.

18. The method of claim 17, further comprising the step of machining at least one of the previously sintered parts with the least one internal channel prior to the steps of assembling and fusing the parts together.

19. The method of claim 18, wherein a plurality of coolant holes are machined in at least one previously sintered part and the at least one previously sintered part having the plurality of coolant holes is fused to the at least one previously sintered part having the at least one internal channel.

20. The method of claim 17, wherein a plurality of internal coolant channels having predetermined angles and positions are machined in at least one previously sintered part.

21. The method of claim 17, wherein the tool is a drill and wherein a first previously sintered part forming a shank of the drill made of a first grade of hard metal composition of material, a second previously sintered part forming the point of the drill made of a second grade of hard metal composition are provided.

22. The method of claim 17, wherein the tool is a drill, each of the plurality of previously sintered parts forming a section of the drill.

23. The method according to claim 22, wherein at least two sections of the drill are formed of a different cemented carbide.

24. A wear resistant tool comprising:
a plurality of previously sintered parts, each of the plurality of previously sintered parts being formed of a hard metal composition of material, at least one of the previously sintered parts having at least one internal channel, wherein the plurality of previously sintered parts can be assembled into a shape of a unitary body; and
a joining surface disposed on each of the plurality of previously sintered parts, wherein when the parts are assembled each joining surface is brought into contact to form a bonding interface therebetween, such that when the assembled parts are subject to a vacuum or gas atmosphere, without the application of external pressure, and to a temperature sufficient to fuse the plurality of previously sintered parts, the plurality of previously sintered parts are joined together at a respective bonding interface to form the unitary body.

25. The wear resistant tool of claim 24, wherein each of the plurality of previously sintered parts has a different size.

26. The wear resistant tool of claim 24, wherein each of the plurality of previously sintered parts has a different shape.

27. The wear resistant tool of claim 24, wherein the hard metal composition of material is cemented carbide.

28. The wear resistant tool of claim 27, wherein the cemented carbide has a hard phase of tungsten carbide and of one or more carbides, nitrides or carbonitrides selected from the group of titanium, chromium, vanadium, tantalum, niobium bonded by a metal phase selected from the group of cobalt, nickel, iron and combinations thereof.

29. The wear resistant tool of claim 27, wherein each of the plurality of previously sintered parts is made of the same cemented carbide.

30. The wear resistant tool of claim 27, wherein each of the plurality of previously sintered parts is made of different cemented carbide.

31. The wear resistant tool of claim 24, wherein the hard metal composition of material is a cermet.

32. The wear resistant tool of claim 31, wherein the cermet has a hard phase selected from the group of one or more carbides, nitrides or carbonitrides of titanium, chromium, vanadium, tantalum, niobium bonded by a metallic phase selected from the group of cobalt, nickel, iron and combinations thereof.

33. The wear resistant tool of claim 24, wherein the assembled parts are heated to a temperature lower than a melting point of the lower sintering temperature of each of the plurality of previously sintered parts to fuse the parts at the bonding interface.

34. The wear resistant tool of claim 24, wherein a plurality of internal coolant channels having predetermined angles and positions are machined in at least one of the plurality of previously sintered parts.

35. The wear resistant tool of claim 24, wherein the tool is a drill and wherein a first previously sintered part of a first grade of hard metal composition of material forms a shank of the drill and a second previously sintered part of a second grade of hard metal composition of material forming a point of the drill.

36. The wear resistant tool of claim 24, further comprising a plurality of coolant holes in at least one of the plurality of previously sintered parts.

37. The wear resistant tool of claim 36, wherein the part having the coolant holes is fused to the at least one plurality of previously sintered parts having the at least one internal channel.

\* \* \* \* \*